United States Patent [19]

Janiszewski

[11] Patent Number: 4,836,351
[45] Date of Patent: Jun. 6, 1989

[54] MOTOR VEHICLE CLUTCH

[75] Inventor: Grzegorz Janiszewski, Angered, Sweden

[73] Assignee: AB Volvo, Goteborg, Sweden

[21] Appl. No.: 194,934

[22] Filed: May 18, 1988

[30] Foreign Application Priority Data

May 18, 1987 [SE] Sweden ................................ 8702031

[51] Int. Cl.⁴ ........................ F16D 13/42; F16D 21/06
[52] U.S. Cl. .............................. 192/48.91; 192/70.16; 192/10.19; 192/70.2; 403/355
[58] Field of Search ............... 192/48.91, 70.16, 70.19, 192/70.2, 70.21; 403/355, 359

[56] References Cited

U.S. PATENT DOCUMENTS 4,697,677 10/1987 Janiszewski ...................... 192/48.91

FOREIGN PATENT DOCUMENTS 0681145 8/1939 Fed. Rep. of Germany ... 192/70.19

Primary Examiner—Rodney H. Bonck
Assistant Examiner—Andrea Pitts
Attorney, Agent, or Firm—Young & Thompson

[57] ABSTRACT

A motor vehicle clutch comprises two clutch plates or discs (4, 5) each mounted on a respective input shaft (9, 10) of a gear box. With the aid of a linearly movable pressure plate (6) it is possible to press alternately one clutch plate (5) against a pressure plate (7) stationarily mounted on the flywheel (1) and the other clutch plate (4) against the flywheel. Torque is transmitted between the movable clutch plate and the flywheel with the aid of spherical elements (16) located in grooves (12, 15) in the movable pressure plate and in a flange (8) firmly connected to the flywheel, while accurately centering the pressure plate at the same time.

6 Claims, 1 Drawing Sheet

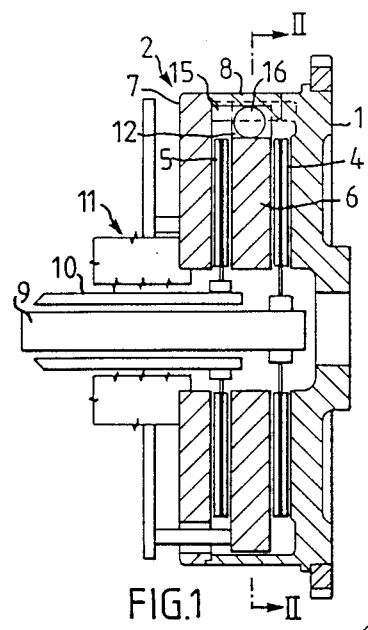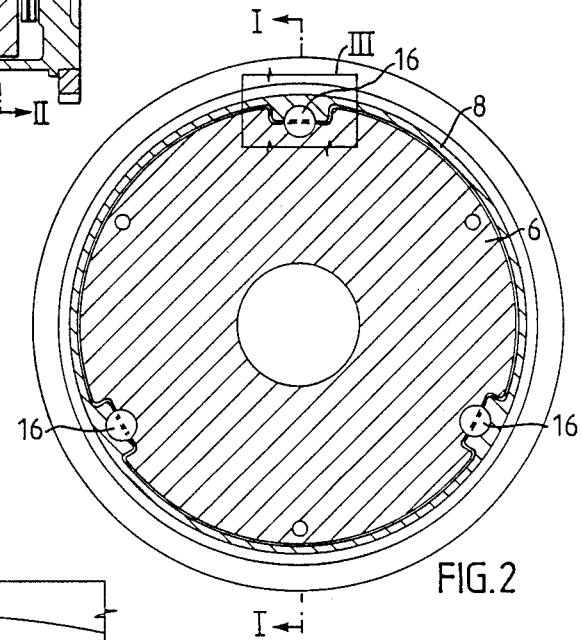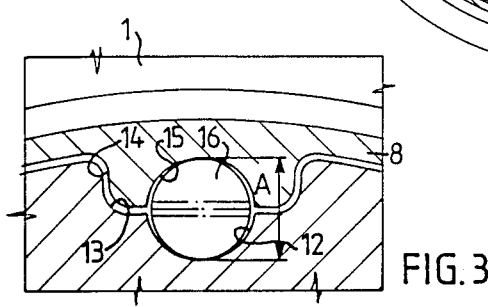

MOTOR VEHICLE CLUTCH

The present invention relates to a clutch for motor vehicles and particularly, but not exclusively, to a clutch for use with a mechanical automatic gear box, said clutch comprising a clutch plate or disc which is non-rotatably mounted on a first gear-box input shaft; an axially displaceable first pressure plate which is held against rotation relative to a flywheel; a second pressure plate which is firmly connected to the flywheel; a second clutch plate or disc which is arranged between the first and second pressure plates and non-rotatably mounted on a second input shaft journalled concentrically with the first input shaft; and in which clutch the first pressure plate can be alternately pressed against the clutch plates and set to an intermediate position in which both clutch plates are free from load from the first pressure plate.

When using a clutch of this kind in a five-gear gear box for instance, the movable pressure plate will urge the second clutch plate against the stationary clutch plate when the vehicle is driven in first, third and fifth gear, and the first clutch plate is urged against the flywheel when the vehicle is driven in second and fourth gear. The gear shift is effected through a gear selector, such as to activate two gear drives simultaneously. Prior to shifting gear from, e.g., first to second, the gear drive of the second gear is activated and the actual gear shift, or gear change, is effected by displacement of the movable pressure plate from the stationary pressure plate towards the flywheel, so as to release the second clutch plate and to press the first clutch plate against the flywheel. It is important that the torque transmission connection of the movable pressure plate to the flywheel is such that the resistance against this axial displacement is constant and as small as possible in both directions from the neutral position, if the gear shift sequence through all gears is to be uniform. This is difficult to achieve, however, with hitherto known connections between pressure plate and flywheel, and is quite simply impossible with a conventional type of connection comprising a plurality of circumferentially spaced leaf springs which are attached to the pressure plate and to the clutch housing.

The object of the present invention is to provide a clutch of the kind described in the introduction which has between the movable pressure plate and the flywheel a connection which will not influence the gear shift process while also guaranteeing that the pressure plate will be centred relative to the flywheel.

This object is achieved in accordance with the invention by means of an inventive clutch in which the first pressure plate has provided externally thereon axially extending grooves which are spaced uniformly around the plate circumference; in which the flywheel or a member firmly attached thereto is provided with axially extending internal grooves which are located opposite the external grooves in the pressure plate such as to define with said external grooves axially extending channels of at least substantially circular cross-section; and in which at least one spherical body is located in each channel and functions as a means for transmitting torque between the flywheel and the first pressure plate.

By journalling the pressure plate with ball bearings in this way there is obtained (a) a connection which presents very little friction between the plate and the flywheel, (b) a connection whose resistance to linear displacement is furthermore constant over the whole of the displacement path, and (c) a connection which will ensure that the pressure plate is accurately centered.

The invention will now be described in more detail with reference to an exemplifying embodiment thereof illustrated in the accompanying drawing, in which FIG. 1 is a schematic longitudinal sectional view of a clutch according to the invention;

FIG. 2 is a cross-sectional view taken on the line II—II in FIG. 1; and

FIG. 3 is an enlarged view of the fragment III in FIG. 2.

The reference numeral 1 in the drawing designates the flywheel of a vehicle engine to which there is connected a clutch, which is identified generally by the reference numeral 2. The clutch includes a first clutch plate or disc 4, a second clutch plate or disc 5, a first pressure plate 6 which is connected to the flywheel 1 in a manner such as to be axially displaceable but not rotatable relative thereto, and a second pressure plate 7 which is attached to a peripheral flange 8 on the flywheel. The clutch plate 4 is connected to an input shaft 9 and the clutch plate 5 to an input shaft 10 of a gear box (not shown). The gear box may be a five-gear gear box in which the input shaft 9 functions as the gear-box drive shaft when the vehicle is driven in second and fourth gear, whereas the input shaft 10 functions as the gear-box drive shaft when the vehicle is driven in first, third and fifth gear.

When the vehicle is in first gear the movable pressure plate 6 will therefore urge the clutch plate against the stationary pressure plate 7. Subsequent to selecting the second gear in the gear box, the actual gear shift is effected by linear displacement of the movable pressure plate 6 so as to disengage the clutch plate 5 and instead press the clutch plate 4 against the flywheel. In the FIG. 1 illustration the pressure plate 6 is shown in an intermediate neutral position in which none of the clutch plates 4, 5 is loaded by the pressure plate 6.

The pressure plate 6 is displaced with the aid of means 11, illustrated only schematically in FIG. 1, which may be of a known kind and which comprises, for instance, a hydraulic piston-cylinder device which is located externally of the rotational parts of the clutch and which loads the pressure plate in both directions through the intermediary of a clutch fork, a clutch engaging and clutch release bearing, and lever arms. The mechanism used may, for instance, be of the kind described and illustrated in SE-A-8403347-1.

For the purpose of transmitting torque from the flywheel 1 to the movable pressure plate 6 while achieving, at the same time, negligible resistance against axial movement of the pressure plate, the outer peripheral surface of the plate has located therein three axial grooves 12. The grooves 12 are uniformly spaced apart at an angle of 120° and are formed in recesses 13 in the plate 6. The flange 8 (which in the illustrated embodiment is an integral part of the flywheel 1) connected to the flywheel 1 and the stationary pressure plate 7 is provided with ridges 14 which are complementary to the recesses 13 and which present grooves 15 which lie opposite the grooves 12. Located in each channel defined by respective pairs of grooves 12, 15 is a spherical element 16. The grooves 12, 15 are configured and arranged so that the distance "A" (see FIG. 3) between respective groove bottoms is equal to the diameter of the spherical elements and so that the grooves have a slightly larger radius than the radius of said elements.

This enables the spherical elements 16 to roll with low friction between the grooves 12, 15 while enabling a large torque to be transmitted at the same time. By journalling the pressure plate in this manner, the pressure plate will be accurately centered, which is important from the aspect of balance.

I claim:

1. A clutch for motor vehicles, particularly for a mechanical automatic gear box, comprising a first clutch plate which is non-rotatably connected to a first input shaft of the gear box; a first pressure plate which is linearly displaceable but not rotatable relative to the engine flywheel of the vehicle; a second pressure plate which is stationarily connected to the flywheel; a second clutch plate which is located between the first and second pressure plates and non-rotatably connected to a second input shaft journalled concentrically with the first input shaft, and in which clutch the first pressure plate can be alternately urged against the clutch plates and set to an intermediate position in which none of the clutch plates is loaded by the first pressure plate, characterized in that the first pressure plate (6) is provided around its outer circumference with uniformly spaced axially extending grooves (12); in that the flywheel (1) or a member (8) firmly connected to the flywheel, is provided with internal, axially extending grooves (15) which lie opposite external grooves in the pressure plate such as to form with said external grooves axially extending channels having at least a substantially circular cross-sectional shape; and in that at least one spherical element (16) is located in each channel and functions as a means for transmitting torque between the flywheel (1) and the first pressure plate (6).

2. A clutch according to claim 1, characterized in that the radius of the respective grooves (12, 15) is slightly larger than the radius (16) of the spherical elements; and in that the depths of respective grooves is smaller than their radius by an extent such that the distance (A) between the bottoms of the mutually co-acting external and internal grooves (12, 15) is equal to the diameter of the spherical elements.

3. A clutch according to claim 1, characterized in that the flywheel (1) has a peripheral flange part (8) which projects out over the first pressure plate (6) and the inwardly facing surface of which has the internal grooves (15) provided therein.

4. A clutch according to claim 3, characterized in that the axial grooves (15) of the peripheral flange part (8) are formed in ridges (14) on said flange part; and in that the pressure plate (6) has provided therein recesses (13) the cross-sectional shape of which correspond to the cross-sectional shape of the ridges and in which the ridges engage and in which the grooves (12) in the pressure plate are formed.

5. A clutch according to claim 1, characterized by three channels with a spherical element (16) located in each channel.

6. A clutch according to claim 1, characterized in that the second pressure plate (7) is firmly connected to the peripheral flange part (8).

* * * * *